United States Patent [19]

Mestanza et al.

[11] Patent Number: 5,948,876
[45] Date of Patent: Sep. 7, 1999

[54] POLYPHENOLS AS POLYCARBONATE BRANCHING AGENTS

[75] Inventors: Raphael Mestanza, Bergen op Zoom, Netherlands; Patrick Joseph McCloskey, Watervliet, N.Y.; Theodorus Lambertus Hoeks, Bergen op Zoom; Adrianus Alphonsus Kusters, Chaam, both of Netherlands; Pin-Pin Wu, San Diego, Calif.; Ye-Gang Lin, Evansville, Ind.

[73] Assignee: General Electric Company, Schenectady, N.Y.

[21] Appl. No.: 08/988,920

[22] Filed: Dec. 11, 1997

Related U.S. Application Data

[63] Continuation-in-part of application No. 08/954,458, Oct. 20, 1997.

[51] Int. Cl.[6] .................................................. C08G 64/00
[52] U.S. Cl. .......................................................... 528/196
[58] Field of Search .................................................. 528/196

[56] References Cited

U.S. PATENT DOCUMENTS

| | | | |
|---|---|---|---|
| 2,999,835 | 9/1961 | Goldberg | 528/196 |
| 3,027,814 | 4/1962 | Schnellmann | 292/64 |
| 3,028,365 | 4/1962 | Schnell et al. | 528/196 |
| 3,030,331 | 4/1962 | Goldberg | 528/196 |
| 3,153,008 | 10/1964 | Fox | 528/196 |
| 3,169,121 | 2/1965 | Goldberg | 528/196 |
| 3,275,601 | 9/1966 | Schnell et al. | 528/196 |
| 3,334,154 | 8/1967 | Kim | 528/196 |
| 3,489,716 | 1/1970 | Kalkins | 528/196 |
| 3,839,247 | 10/1974 | Bialous et al. | 528/196 |
| 4,138,379 | 2/1979 | Scott et al. | 525/433 |
| 4,188,314 | 2/1980 | Fox et al. | 525/433 |
| 4,286,083 | 8/1981 | Kochanowski | 528/173 |
| 4,330,669 | 5/1982 | Ikeguchi et al. | 528/289 |
| 4,395,062 | 7/1983 | F'Geppert | 292/64 |
| 4,487,896 | 12/1984 | Mark et al. | 525/439 |
| 4,621,132 | 11/1986 | Quinn et al. | 528/194 |

*Primary Examiner*—Terressa Mosley
*Attorney, Agent, or Firm*—Robert T. Barker; Noreen C. Johnson

[57] ABSTRACT

Branched polycarbonates are prepared by the reaction of a linear or branched polycarbonate with a branching resin having a molecular weight up to about 3,000, typically a novolak or a bisphenol polymer. The reaction preferably takes place in the presence of a carbonate equilibration catalyst such as a quaternary bisphenolate.

20 Claims, No Drawings

POLYPHENOLS AS POLYCARBONATE BRANCHING AGENTS

CROSS-REFERENCE TO RELATED APPLICATION

This application is a continuation-in-part of copending application Ser. No. 08/954,458 filed Oct. 20, 1997.

BACKGROUND OF THE INVENTION

The invention relates to polycarbonate resins and their use in molding articles.

Aromatic polycarbonate resins are a well known class of synthetic polymeric resins, generally prepared by the reaction of a polyhydric phenol with a carbonate precursor; see for example U.S. Pat. No. 3,028,365. Although such resins have been found to be moldable under a broad range of molding conditions suitable for thermoplastic resins, only select polycarbonate resin compositions are useful for blow molding for the fabrication of such articles as water bottles. This is due to the unique requirements of a thermoplastic resin for blow molding operations; see for example the requirements for the branched polycarbonate resins described in U.S. Pat. Nos. 4,286,083 and 4,621,132.

The branched polycarbonate resins differ from most thermoplastic polymers used for molding in their melt rheology behavior. In particular, they exhibit high melt elasticity and high melt strength. Both of these are important in extrusion blow molding, particularly in fabrication by extrusion blow molding of relatively large articles. Melt elasticity is the recovery of the elastic energy stored within the melt from distortion or orientation of the molecules by shearing stresses. Melt strength may be simply described as the tenacity of a molten strand and indicates the ability of the melt to support a stress. These advantageous properties of the branched resins are in large part a result of their non-Newtonian flow characteristics.

In the conventional blow molding operation, a tube of the heat-softened polycarbonate resin may be extruded vertically into a mold. The extrudate is then pressed unto the mold surfaces with a pressurized gas flow (usually air or inert gas), shaping the heat-softened resin. In practice, the desired physical characteristics of a blow moldable polycarbonate resin can be achieved preferably by a branched polycarbonate.

Currently, branched resins are typically synthesized from monomeric materials, the proper melt strength and viscosity being obtained by controlling the molecular weight and the level of branching agent. Thus, U.S. Reissue Pat. No. 27,682 describes the preparation of branched polycarbonates in a conventional interfacial reaction or from chloroformates. U.S. Pat. No. 4,415,725 describes a similar method which may employ a carbonyl halide such as phosgene (as in the interfacial procedure), a haloformate or a diaryl carbonate.

This is time consuming and expensive and any "off-specification" material produced is wasted, disadvantages which are not associated with the production of linear polycarbonate resins. A preferred method, disclosed in U.S. Pat. No. 5,021,521, is by reactive extrusion of a linear or branched polycarbonate with a branching agent. Copending, commonly owned application Ser. No. 08/653,166 describes solid state polymerization in the presence of a branching agent.

SUMMARY OF THE INVENTION

By the method of the present invention, it is possible to produce a polycarbonate resin possessing a certain degree of branching and molecular weight via reactive extrusion. This is achieved by melt extruding a linear polycarbonate with a specific branching agent and an appropriate catalyst.

The invention comprises is a method for producing a branched polycarbonate which comprises contacting a linear or branched aromatic polycarbonate reactant with a branching resin which is a polyphenol having a molecular weight up to about 3,000.

Advantageously, the branching reaction is effected by melt extrusion.

DETAILED DESCRIPTION; PREFERRED EMBODIMENTS

The branched polycarbonate resins produced by the method of the invention are particularly useful as blow moldable resins useful, for example, for fabrication of containers (e.g., water bottles, cans and gas tanks), automotive exterior applications (e.g., bumpers, aerodams, spoilers and ground effects packages) and are characterized in part by enhanced melt strength and melt elasticity. They are also useful in applications such as profile extrusion (for example of wire and cable insulation, extruded bars, pipes, fiber optic buffer tubes, and sheets) and thermoforming (for example of automotive exterior applications and food packaging), all of which require the enhanced flow properties of a branched polycarbonate.

The linear polycarbonates advantageously branched by the method of the invention are well known synthetic polymers as are the methods of their preparation.

Polycarbonate resins (linear) and their method of preparation by interfacial polymerization are well known; see for example the details provided in the U.S. Pat. Nos. 3,028,365, 3,334,154, 3,275,601, 3,915,926, 3,030,331, 3,169,121, 3,027,814 and 4,188,314, all of which are incorporated herein by reference thereto.

Linear polycarbonate resins used in the method of the invention are resins comprising structural units of the formula

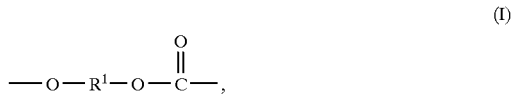

wherein $R^1$ is a divalent aromatic radical of a dihydric phenol employed in the polymerization reaction, which comprises the reaction of the dihydric phenol with a carbonate precursor. The reaction is well known and is described for example in the U.S. Pat. Nos. 3,028,365, 3,334,154, 3,275,601, 3,915,926, 3,030,331, 3,169,121 and 3,027,814.

Although the reaction conditions of the preparative processes may vary, the interfacial polymerization processes typically involve dissolving or dispersing the phenol reactant in a suitable water-immiscible solvent medium and contacting the reactants with the carbonate precursor, such as phosgene, in the presence of a suitable catalyst and an aqueous caustic solution under controlled pH conditions. The most commonly used water immiscible solvents include methylene chloride, 1,1-dichloroethane, chlorobenzene, toluene and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins comprises a phosgenation reaction. The temperature at which the phosgenation reaction proceeds may vary from below 0° C. to above 100° C. The phosgenation reaction preferably proceeds at temperatures of from room temperature (25° C.) to 50° C. Since the reaction is exothermic, the rate of phosgene addition and solvent reflux may be used to control the reaction temperature. The amount of phosgene required will generally depend upon the amount of the dihydric phenol present.

Typical of some of the dihydric phenols that are advantageously employed are bisphenols such as bis(4-hydroxyphenyl)methane, 2,2-bis(4-hydroxy-3-methylphenyl)propane, 4,4-bis(4-hydroxyphenyl)heptane, 2,2-bis(4-hydroxy-3,5-dichlorophenyl)propane and 2,2-bis(4-hydroxy-3,5-dibromophenyl)propane; dihydric phenol ethers such as 4-hydroxyphenyl ether and 3,5-dichloro-4-hydroxyphenyl ether; dihydroxybiphenyls such as 3,3'-dichloro-4,4'-dihydorxybiphenyl; dihydroxyaryl sulfones such as bis(4-hydroxyphenyl)sulfone and bis(3,5-dimethyl-4-hydroxyphenyl)sulfone; dihydroxybenzenes, such as resorcinol and hydroquinone; halo- and alkyl-substituted dihydroxybenzenes, such as 1,4-dihydroxy-2,5-dichlorobenzene and 1,4-dihydroxy-3-methylbenzene; and dihydroxydiphenyl sulfides and sulfoxides such as 4-hydroxyphenyl sulfide and bis(4-hydroxyphenyl) sulfoxide. A variety of additional dihydric phenols are also available and are disclosed in U.S. Pat. Nos. 2,999,835, 3,028,365 and 3,153,008, all of which are incorporated herein by reference. It is, of course, possible to employ two or more different dihydric phenols or a combination of a dihydric phenol with glycol. The preferred dihydric phenols are the bisphenols, especially 2,2-bis(4-hydroxyphenyl) propane or "bisphenol A".

The term "polycarbonate" as used herein is also inclusive of copolyestercarbonates, i.e.; resins which contain, in addition to polycarbonate units of formula I, carboxylate units, for example of the formula

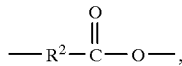

(II)

wherein $R^2$ is a divalent hydrocarbon group such as an alkylene, alkylidene, or cycloalkylene group; an alkylene, alkylidene or cycloalkylene group containing ethylenic unsaturation; an aromatic group such as phenylene or biphenylene; two or more aromatic groups connected through non-aromatic linkages such as alkylene or alkylidene groups; or a divalent aralkyl radical such as tolylene or xylylene.

The copolyestercarbonate resins used in the method of the invention include some which are generally well known. In general, they are prepared as described above for the preparation of polycarbonates, but by the added presence of a difunctional carboxylic acid (ester precursor) in the water immiscible solvent; see for example U.S. Pat. Nos. 3,169,121 and 4,487,896 incorporated herein by reference.

In general, any difunctional carboxylic acid (dicarboxylic acid) conventionally used in the preparation of linear polyesters may be utilized in the preparation of the linear copolyestercarbonate resins. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference.

Preferred difunctional carboxylic acids employed are the aromatic dicarboxylic acids. Particularly useful aromatic dicarboxylic acids are those represented by the formula

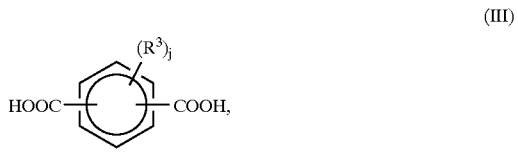

(III)

wherein j is a positive integer having a value of 0 to 4 inclusive and each $R^3$ is independently an alkyl radical, preferably a $C_{1-5}$ alkyl radical.

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Most preferred as aromatic dicarboxylic acids are isophthalic acid, terephthalic acid and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the difunctional carboxylic acid per se, it is possible, and sometimes even preferred, to employ a reactive derivative of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride or mixtures thereof. It should be understood then that the term "difunctional carboxylic acid" as used herein includes the reactive derivatives.

The proportions of reactants employed to prepare the linear copolyestercarbonate resins will vary in accordance with the proposed use of the product resin. Those skilled in the art are aware of useful proportions, as described in the patents referred to above. In general, the amount of the ester bonds may be from about 5 to about 90 mole percent, preferably from about 35 to about 80 mole percent, relative to the carbonate bonds. For example, 5 moles of bisphenol A reacting completely with 4 moles of isophthaloyl dichloride and 1 mole of phosgene would give a copolyestercarbonate having 80 mole percent ester bonds.

In the conventional polymerization methods of preparing polycarbonates, a molecular weight regulator (a chain stopper) is generally added to the reaction mixture prior to or during the contacting with a carbonate precursor. Useful molecular weight regulators include monohydric phenols such as phenol, chroman-I, p-t-butylphenol and p-cumylphenol. Techniques for the control of molecular weight are well known in the art.

The polycarbonates typically used as starting materials in the method of the invention are usually linear. However, slightly branched polycarbonate resins may also be employed as raw materials.

In accordance with the method of the present invention, a branching resin is homogeneously admixed with the linear polycarbonate resin to be branched. Admixture may be carried out with the aid of conventional resin mixing apparatus, including but not limited to conventional resin extruders equipped to mix two different resin materials, dry mixers and the like. The solid resins may be premixed before introduction into the extruder. Conventional resin extruders are readily available and, accordingly, are preferred.

The thermoplastic branching resins employed according to the invention are polyphenolic polymers having a molecular weight up to about 3,000; that is, they are polyphenolic oligomers. They principally comprise two types of resins: novolaks and polymers of bis(hydroxyphenyl)alkanes or of hydroxyphenyl ethers. The polymers of bis(hydroxyphenyl) alkanes and of hydroxyphenyl ethers are hereinafter sometimes designated "bisphenol polymers" for brevity.

The novolak resins are typically prepared by the polymerization of monomeric phenols with formaldehyde in a molar ratio of 1:1 and in the presence of an acid catalyst. Preferably, the novolak resin has 3–10 phenol moieties per molecule and an average degree of polymerization of 4–5.

Bisphenol polymers are often preferred since they are relatively colorless, while the novolaks are usually yellow or brown in color and impart the same color to the polycarbonates. More color development is frequently noted as a result of the branching reaction. This makes the bisphenol polymers particularly advantageous for use to fabricate such items as water bottles, for which transparency and low color are highly preferred.

Typical bisphenol polymers comprise structural units of the formulas

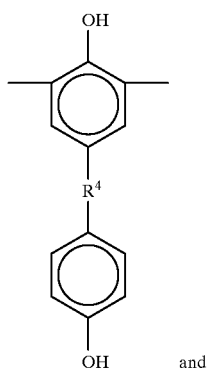

(IV)

and

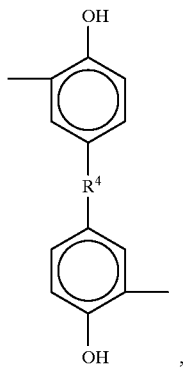

(V)

wherein $R^4$ is an alkylene radical or oxygen. Illustrative monomers (hereinafter "bisphenol monomers") for the preparation of bisphenol polymers are bis(4-hydroxyphenyl) methane, 1,1-bis(4-hydroxyphenyl)ethane, 2,2-bis(4-hydroxyphenyl)propane or "bisphenol A" and 4-hydroxyphenyl ether. Bisphenol A ($R^4$ is isopropylidene) is usually preferred by reason of its availability and relatively low cost.

The bisphenol polymers may be prepared by oxidation with oxygen or peroxide of the bisphenol monomer in the presence of a peroxidase or oxidase enzyme. Reference is made, for example, to U.S. Pat. No. 5,112,752, the disclosure of which is incorporated by reference herein. They may be obtained from Enzymol International, Inc.

Both homopolymers of the bisphenol monomers and copolymers thereof with other phenols, typically monohydroxy compounds such as phenol, may be employed. When copolymers are employed, it is preferred that they contain a major proportion, most preferably at least about 70% by weight, of units derived from the bisphenol monomer. The homopolymers, however, are preferred.

The molecular weight of the bisphenol polymer should be up to about 3,000. It has been found that little or no branching occurs when higher molecular weight polymers are employed.

A branching proportion of the branching resin will depend upon the density of branches desired and the number of branch sites available. In general, the proportion of branching resin is about 0.1–25% and preferably about 0.1–2.0% by weight based on polycarbonate.

The branching of the linear polycarbonate resin is effected advantageously by an equilibration reaction. Said reaction is conducted by heating the mixed reactant resins to an equilibration temperature, generally within the range of about 100–350° C., preferably 200–250° C. When a quaternary bisphenolate as described hereinafter is employed as a catalyst, it decomposes during the reaction to an olefin, a bisphenol and the relatively volatile pentaalkylguanidine.

A catalytic proportion of a carbonate equilibration catalyst may be present to promote the exchange. A catalytic proportion is generally within the range of about 10–10,000 ppm, preferably about 10–500 ppm, by weight based on polycarbonate.

Useful equilibration catalysts, employable singly or in combination, include basic catalysts conventionally employed in transesterification reactions. Representative of such catalysts are oxides, hydrides, hydroxides and amides of alkali or alkaline earth metals, such as lithium hydroxide; basic metal oxides such as zinc oxide; salts of weak acids such as lithium stearate; organotin catalysts such as dibutyltin oxide; aluminum or boron anion containing catalysts such as those described in U.S. Pat. Nos. 4,330,669 and 4,395,062; and quaternary bisphenolates.

The quaternary bisphenolates, disclosed and claimed in copending, commonly owned application Ser. No. 08/768, 871, are compounds having the molecular formula $$H_3Q[(OA)_2Y],$$ (V)

wherein A is unsubstituted p-phenylene, Q is a monocationic carbon- and nitrogen-containing moiety containing 9–34 atoms and Y is a bridging radical in which one or two carbon atoms separate the A values. The bridging radical Y is most often a hydrocarbon group and particularly a saturated group such as methylene, cyclohexylidene or isopropylidene. Preferably, Y is isopropylidene.

The Q radical in the quaternary bisphenolates of formula V is a monocationic carbon- and nitrogen-containing moiety; i.e., a moiety having a single positive charge. It may be a tetraalkylammonium moiety wherein the alkyl groups contain 2–5 carbon atoms, as illustrated by tetraethylammonium, tetra-n-butylammonium and diethyldi-n-butylammonium. Preferably, however, it is a hexaalkylguanidinium moiety such as hexaethylguanidinium, hexa-n-butylguanidinium or tetraethyldi-n-butylguanidinium. The atom content of 9–34 atoms includes both carbon and nitrogen atoms and its size is governed by the fact that the tetraethylammonium cation contains 8 carbon atoms and one nitrogen atom for a total of 9, while the hexapentylguanidinium cation contains 31 carbon atoms and 3 nitrogen atoms for a total of 34.

Quaternary bisphenolates of formula V may be prepared by the reaction of a bisphenol of the formula $(HOA)_2Y$ with an alkali metal hydroxide and a quaternary salt of the formula $Q^+X^-$. The X value in the quaternary salt is halide, preferably bromide or chloride and most preferably chloride. Typical reaction temperatures are in the range of about 10–125° and preferably about 10–50° C. An inert atmosphere such as nitrogen or argon may be employed.

The quaternary bisphenolate-forming reaction takes place in an aqueous medium, most often also containing a $C_{1-3}$ alkanol and preferably methanol. The quaternary bisphenolate is usually insoluble in water but soluble in the alkanol, and can be isolated by precipitation with an excess of water.

It is generally found convenient to initially form an alcoholic mixture of bisphenol and alkali metal hydroxide, whereupon the bisphenol dissolves as the alkali metal salt, and to add thereto an aqueous-alcoholic solution of the quaternary salt. Another alternative is to combine the bisphenol and quaternary salt and gradually add aqueous alkali metal hydroxide solution thereto. In the water-alkanol embodiment, ambient temperatures in the range of about 20–30° C. are generally preferred.

In still another procedure, a non-polar organic solvent such as toluene is employed. An aqueous alkaline solution of the quaternary salt is added gradually to a combination of the bisphenol and refluxing solvent. The product precipitates out and can be purified by washing with water. Further purification of product obtained by any of these methods can be achieved by recrystallization, most often from an alkanol and preferably methanol.

Reactant proportions are not critical in the method for preparing the quaternary bisphenolates. This is apparent from the fact that their formation was initially discovered in mixtures comprising the non-stoichiometric proportions of 2 moles of alkali metal hydroxide, 2 moles of hexaalkylguanidinium chloride and 1 mole of bisphenol. For optimum yield, however, a bisphenol:quaternary salt:alkali metal hydroxide molar ratio of 1:2:0.5–1.5 and especially 1:2:1 is preferred.

The preparation of quaternary bisphenolates is illustrated by the following example. "Catalyst solution" in th is example is an aqueous solution of 28.54% (by weight) hexaethylguanidinium chloride and 10.09% sodium chloride.

EXAMPLE 1

A 5-I round-bottomed flask was purged with nitrogen and charged with 228.29 g (1 mole) of bisphenol A, 20.29 g (0.5 mole) of sodium hydroxide and 300 ml of methanol. The resulting solution was magnetically stirred under nitrogen. A blend of 462.26 g of catalyst solution (0.5 mole of hexaethylguanidinium chloride) and about 175 ml of methanol was added rapidly, whereupon a solid immediately precipitated. Methanol, 900 ml, was added with stirring to redissolve all of the solids.

Stirring was continued for 15 minutes, after which 1100 ml of water was added to reprecipitate the solids. The flask was cooled to 20° C. in ice and vacuum filtered. The filter cake was washed with 1200 ml of water and dried in a vacuum oven at 75° C., yielding 335.44 g (98.1% crude yield) of a white solid. Recrystallization from methanol followed by vacuum drying yielded 244.14 g (71.4% of theoretical) of purified product in the form of colorless crystals with a melting point of 208–210° C. The purified product was shown by elemental analysis, atomic adsorption analysis and proton nuclear magnetic resonance spectroscopy to be the desired hexaethylguanidinium bisphenolate, having the stoichiometric proportions of three hydrogen atoms, one hexaethylguanidinium cation moiety and two bisphenol A dianion moieties.

The thermoplastic molding resin compositions of the instant invention may also be admixed with various commonly known and used additives such as antioxidants; antistatic agents; inert fillers such as glass, talc, mica, and clay; ultraviolet radiation absorbers such as the benzophenones and benzotriazoles; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as phosphite; flame retardants; and mold release agents.

In the examples which follow, molecular weights are weight average and were determined by gel permeation chromatography relative to polystyrene. R* was calculated as follows:

(I) Generate the complex viscosities (eta*, $\eta$*) at 1 rad/sec and 100 rad/sec, using a dynamic rheometer such as the RDS 7700 (Rheometrics Inc.), and plot against temperature with an interval of about 1° C.

(II) Find the R* temperature, on the plot of viscosity vs. temperature, as that at which the complex viscosity ($\eta$*) at 100 rad/sec is 20,000 poise.

(III) Find the value of the complex viscosity ($\eta$*) at 1 rad/sec at the R* temperature and calculate R* as the ratio of complex viscosity ($\eta$*) at 1 rad/sec to complex viscosity ($\eta$*) at 100 rad/sec (20,000 poise).

Branched polycarbonate resins useful for blow molding usually have an R* value of from about 2.2 to about 4.5. Those made by the method of the present invention will generally have R* values from about 2.2 to about 4.2. A linear polycarbonate usually has an R* value of about 1.45 and a slightly branched polycarbonate, of the type which may be used as a reactant as described hereinabove, usually will have an R* value of less than 2.0 and more usually less than about 1.5.

The invention is illustrated by the following examples.

EXAMPLES 2–4

A quantity of a linear bisphenol A polycarbonate resin (PC-135, General Electric Company, Pittsfield, Mass.) was compounded on a melt extruder (a co-rotating twin screw extruder with a barrel length of 950 mm, and a screw length of 951 mm) under a vacuum of 0.5 atmospheres at 300 RPM and at a temperature profile of 200–300° C. with 0.3% (w/w) of a phenolic resin (ALNOVOL PN 320, Vianova Co.) having 3–10 phenol moieties per molecule and an average degree of polymerization of 4–5 and, as catalysts (Examples 3–4), 300 ppm by weight, based on polycarbonate, of tetrabutylphosphonium tetraphenylborate (catalyst A) or the hexaalkylguanidinium bisphenolate of Example 1 (catalyst B). Upon extrusion, the compounded resin was chopped and representative samples tested for physical properties. The results are reported in Table I.

TABLE 1

| Example | Catalyst | R* | Mw |
|---------|----------|-----|--------|
| 2 |   | 2.5 | 35.200 |
| 3 | A | 2.4 | 28,000 |
| 4 | B | 2.7 | 31.700 |

EXAMPLES 5–7

The procedure of Examples 2–4 was repeated, employing catalyst B and, as branching agents, various poly(bisphenol A) polymers or, in Example 7, a copolymer comprising 80% by weight bisphenol A units and 20% phenol units. The results are given in Table II, in comparison with two controls employing poly(bisphenol A) resins having molecular weights above 3,000. "Branching" is a qualitative criterion based on the graph of shear stress vs. shear rate at values of the latter in the range 0.1–1.0 sec$^{-1}$; high branching is by highly non-Newtonian behavior. Haze and color were visually determined.

TABLE II

| Example | Identity | MW | Branching | Haze | Color |
|---|---|---|---|---|---|
| 5 | Homopolymer | 1,200 | High | None | Slightly yellow |
| 6 | Homopolymer | 2,700 | High | Low | Yellow |
| 7 | Copolymer | 1,200 | Medium | Low | Yellow |
| Control 1 | Homopolymer | 3,700 | None | Medium | Highly yellow |
| Control 2 | Homopolymer | 6,000 | None | High | Highly yellow |

It will be seen that the poly(bisphenol A) polymers having molecular weights below 3,000 afford polycarbonates with substantial branching and relatively low haze and color readings. On the other hand, the controls employing branching polymers of higher molecular weight produced no branching and imparted substantial haze and color to the resins.

EXAMPLES 8–10

The procedure of Examples 5–7 was repeated, using various proportions of poly(bisphenol A) of MW 1,200 and of catalyst B and determining the R* values. The results are given in Table III.

TABLE III

| Example | Branching agent, % | Catalyst, ppm | R* |
|---|---|---|---|
| 8 | 0.6 | 100 | 2.35 |
| 9 | 1.0 | 100 | 3.67 |
| 10 | 0.6 | 120 | 3.35 |

What is claimed is:

1. A method for producing a branched polycarbonate which comprises contacting a linear or branched aromatic polycarbonate reactant with a branching resin which is a polyphenol having a molecular weight up to about 3,000.

2. A method according to claim 1 wherein the polycarbonate reactant is a linear polycarbonate.

3. A method according to claim 2 wherein the branching resin is a novolak.

4. A method according to claim 3 wherein the novolak has 3–10 phenol moieties per molecule and an average degree of polymerization of 4–5.

5. A method according to claim 3 wherein the contact is in the melt.

6. A method according to claim 3 wherein the polycarbonate comprises structural units of the formula

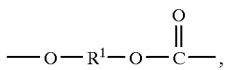

(I)

wherein R$^1$ is a divalent aromatic radical.

7. A method according to claim 6 wherein the polycarbonate is a bisphenol A polycarbonate.

8. A method according to claim 3 wherein the polycarbonate is a copolyestercarbonate.

9. A method according to claim 3 wherein the contact is in the presence of a carbonate equilibration catalyst.

10. A method according to claim 9 wherein the carbonate equilibration catalyst has the molecular formula $$H_3Q[(OA)_2Y]_3 \quad (V)$$

wherein A is unsubstituted p-phenylene, Q is a monocationic carbon- and nitrogen-containing moiety containing 9–34 atoms and Y is a bridging radical in which one or two carbon atoms separate the A values.

11. A method according to claim 10 wherein Q is hexaalkylguanidinium, each A is p-phenylene and Y is isopropylidene.

12. A method according to claim 2 wherein the branching resin is a bisphenol polymer.

13. A method according to claim 12 wherein the bisphenol polymer is poly(bisphenol A).

14. A method according to claim 12 wherein the contact is in the melt.

15. A method according to claim 12 wherein the polycarbonate comprises structural units of the formula

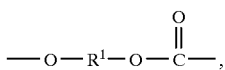

(I)

wherein R$^1$ is a divalent aromatic radical.

16. A method according to claim 15 wherein the polycarbonate is a bisphenol A polycarbonate.

17. A method according to claim 12 wherein the polycarbonate is a copolyestercarbonate.

18. A method according to claim 12 wherein the contact is in the presence of a carbonate equilibration catalyst.

19. A method according to claim 18 wherein the carbonate equilibration catalyst has the molecular formula $$H_3Q[(OA)_2Y]_3 \quad (V)$$

wherein A is unsubstituted p-phenylene, Q is a monocationic carbon- and nitrogen-containing moiety containing 9–34 atoms and Y is a bridging radical in which one or two carbon atoms separate the A values.

20. A method according to claim 19 wherein Q is hexaalkylguanidinium, each A is p-phenylene and Y is isopropylidene.

* * * * *